United States Patent
Sekine et al.

(10) Patent No.: US 11,472,429 B2
(45) Date of Patent: Oct. 18, 2022

(54) VEHICLE CONTROLLER

(71) Applicant: TOYOTA JIDOSHA KABUSHIKI KAISHA, Toyota (JP)

(72) Inventors: Kiyotoshi Sekine, Kakamigahara (JP); Takahiko Kuwabara, Yokohama (JP); Taiyo Uejima, Tokyo-to (JP); Sho Mikuriya, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/190,578

(22) Filed: Mar. 3, 2021

(65) Prior Publication Data

US 2021/0276581 A1    Sep. 9, 2021

(30) Foreign Application Priority Data

Mar. 4, 2020    (JP) .............................. JP2020-037067

(51) Int. Cl.
*B60W 50/12*    (2012.01)
*B60W 40/08*    (2012.01)

(52) U.S. Cl.
CPC ............ *B60W 50/12* (2013.01); *B60W 40/08* (2013.01); *B60W 2540/225* (2020.02); *B60W 2540/229* (2020.02)

(58) Field of Classification Search
CPC .................. B60W 50/12; B60W 40/08; B60W 2540/225; B60W 2540/229
See application file for complete search history.

(56) References Cited

U.S. PATENT DOCUMENTS

| | | | |
|---|---|---|---|
| 11,106,204 B2* | 8/2021 | Kaji | B60W 50/10 |
| 2017/0015318 A1* | 1/2017 | Scofield | G06Q 30/0283 |
| 2017/0232973 A1 | 8/2017 | Otake | |
| 2019/0155279 A1* | 5/2019 | Tayama | G08G 1/0962 |
| 2019/0332106 A1* | 10/2019 | Belloni Mourao | B60W 40/08 |
| 2020/0139992 A1* | 5/2020 | Oba | B60W 50/14 |
| 2020/0216095 A1 | 7/2020 | Isozaki et al. | |

FOREIGN PATENT DOCUMENTS

| | | |
|---|---|---|
| JP | H06156112 A | 6/1994 |
| JP | 2014058229 A | 4/2014 |
| JP | 2017-144808 A | 8/2017 |
| JP | 2019067243 A | 4/2019 |
| JP | 2019127238 A | 8/2019 |
| WO | 2015/200224 A2 | 12/2015 |
| WO | 2019/017216 A1 | 1/2019 |
| WO | 2019/073708 A1 | 4/2019 |

* cited by examiner

*Primary Examiner* — Mohamed Barakat
(74) *Attorney, Agent, or Firm* — Dickinson Wright, PLLC (57) ABSTRACT

The vehicle controller includes a processor configured to determine whether a behavior of a driver of the vehicle satisfies a predetermined enabling condition after execution of a function of automatically stopping the vehicle. The function is executed due to not satisfying a driver-related condition for continuing the automated driving control of the vehicle. The enabling condition relates to driving control of the vehicle and is not imposed before the execution of the function. The processor is further configured to perform the automated driving control of the vehicle only when the behavior of the driver satisfies the enabling condition.

4 Claims, 5 Drawing Sheets

VEHICLE CONTROLLER

FIELD

The present invention relates to a vehicle controller controlling the travel of a vehicle.

BACKGROUND

Techniques to perform automated driving control of a vehicle or to assist a driver in driving a vehicle have been researched (e.g., see Japanese Unexamined Patent Publications Nos. 2014-58229, 6-156112, and 2019-67243). For example, Japanese Unexamined Patent Publication No. 2014-58229 proposes a technique of follow-up control to follow a leading vehicle traveling ahead of a target vehicle. When determining that the driver of the target vehicle is in an abnormal state, this technique automatically starts the follow-up control based on surrounding information including information on the leading vehicle, and then stops the target vehicle and terminates the follow-up control upon acquisition of information on a stop of the leading vehicle during the follow-up control.

Japanese Unexamined Patent Publication No. 6-156112 proposes a technique that automatically slows down and stops a vehicle upon detection of a driver falling asleep at the wheel. This technique then controls the vehicle so that it may travel slower than a predetermined speed, and removes this speed restraint after maintaining it for a predetermined period.

Japanese Unexamined Patent Publication No. 2019-67243 proposes a technique that raises an alarm and applies brakes to determine the state of a driver when he/she is supposed to be in an abnormal state.

SUMMARY

In these techniques, when a driver cannot drive a vehicle properly, a vehicle controller automatically controls motion of the vehicle to a certain extent in order to avoid danger, reducing possible damage to the driver and the vehicle. However, the driver may put too much trust in such vehicle control and neglect to look around the vehicle during travel thereof.

It is an object of the present invention to provide a vehicle controller that can prevent a driver from putting too much trust in vehicle control performed for avoiding danger in response to an abnormality of the driver being detected and also prevent automated driving control of the vehicle from being excessively restricted.

According to an embodiment, a vehicle controller capable of automated driving control of a vehicle is provided. The vehicle controller includes a processor configured to determine whether a behavior of a driver of the vehicle satisfies a predetermined enabling condition after execution of a function of automatically stopping the vehicle. The function is executed due to not satisfying a driver-related condition for continuing the automated driving control of the vehicle. The enabling condition relates to driving control of the vehicle and is not imposed before the execution of the function. The processor is further configured to perform the automated driving control of the vehicle only when the behavior of the driver satisfies the enabling condition.

The processor is preferably further configured to determine whether a predetermined removal condition is satisfied after the execution of the function and to enable the automated driving control of the vehicle after satisfaction of the removal condition even when the enabling condition is not satisfied.

In this case, preferably, the removal condition is that a state in which the driver is able to look ahead of the vehicle continues for a certain period or a certain travel distance; and the processor determines whether the state continues for the certain period or the certain travel distance, based on sequential images obtained by an imaging unit provided in the vehicle so as to capture images of the head of the driver.

In the vehicle controller, preferably, the enabling condition is that the driver holds a steering wheel of the vehicle; and, when receiving, from a sensor provided on the steering wheel, a sensing signal indicating that the driver is holding the steering wheel, the processor determines that the behavior of the driver satisfies the enabling condition.

The vehicle controller according to the present invention has an advantageous effect that it can prevent a driver from putting too much trust in vehicle control performed for avoiding danger in response to an abnormality of the driver being detected and also prevent automated driving control of the vehicle from being excessively restricted.

DESCRIPTION OF EMBODIMENTS

Hereinafter, a vehicle controller will be described with reference to the accompanying drawings. The vehicle controller performs automated driving control of a vehicle under the condition that the driver is continuously looking ahead of the vehicle. The vehicle controller has the function of "driver emergency stop assist" (DESA), and automatically stops the vehicle due to not satisfying a driver-related condition for continuing the automated driving control of the vehicle, e.g., when the driver cannot continue looking ahead of the vehicle. After executing the DESA function, the vehicle controller enables application of the automated driving control only when the behavior of the driver satisfies a predetermined enabling condition related to driving control of the vehicle. The predetermined enabling condition is such that satisfaction thereof is not required before the execution of the DESA function for the purpose of enabling application of the automated driving control. Details of the enabling condition will be described below. Additionally, when a predetermined removal condition is satisfied after the execution of the DESA function, the vehicle controller removes the enabling condition related to the application of the automated driving control.

Figure 1:
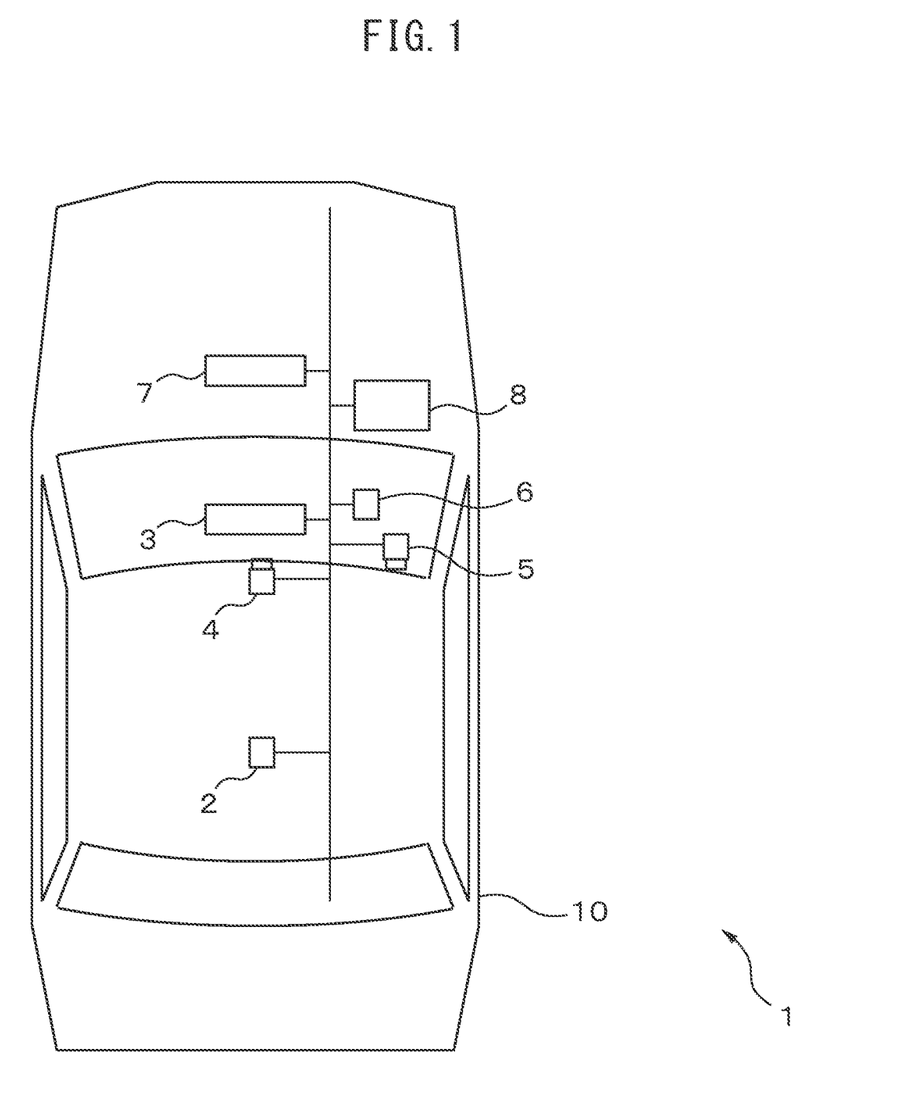
FIG. 1 schematically illustrates the configuration of a vehicle control system including a vehicle controller.
Figure 2:
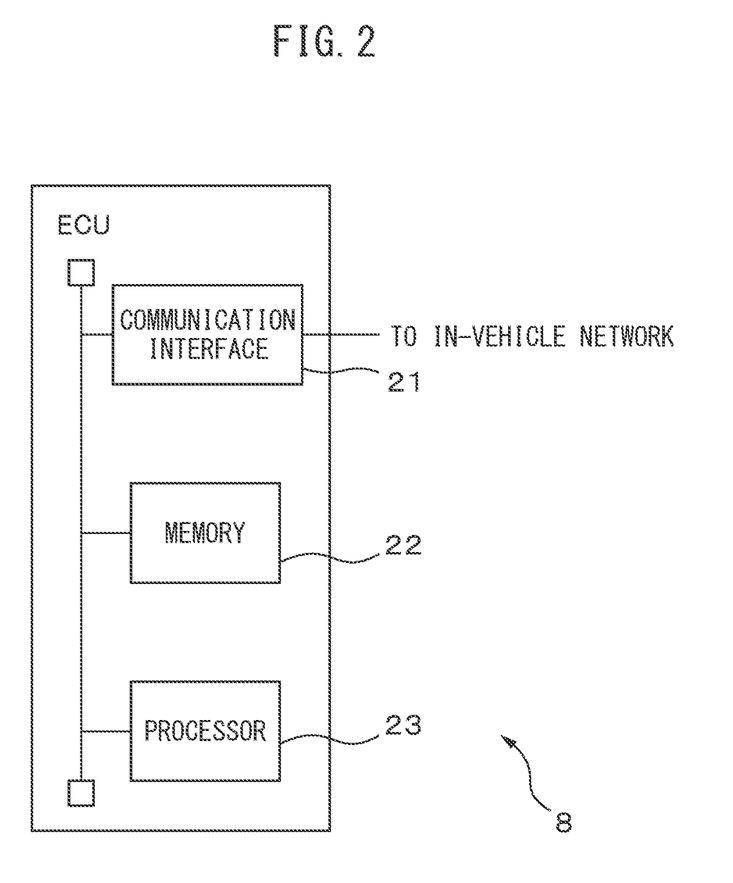
FIG. 2 illustrates the hardware configuration of an electronic control unit, which is an embodiment of the vehicle controller.

FIG. 1 schematically illustrates the configuration of a vehicle control system including the vehicle controller. FIG. 2 illustrates the hardware configuration of an electronic control unit, which is an embodiment of the vehicle controller. In the present embodiment, the vehicle control system 1, which is mounted on a vehicle 10 and controls the vehicle 10, includes a GPS receiver 2, a navigation device 3, a camera 4, a driver monitoring camera 5, a touch sensor 6, a storage device 7, and an electronic control unit (ECU) 8, which is an example of the vehicle controller. The GPS receiver 2, the navigation device 3, the camera 4, the driver monitoring camera 5, the touch sensor 6, and the storage device 7 are connected to the ECU 8 so that they can communicate via an in-vehicle network conforming to a standard, such as a controller area network. The vehicle control system 1 may further include a distance sensor (not illustrated), such as LiDAR or radar, which measures the distance from the vehicle 10 to an object near the vehicle 10. The vehicle control system 1 may further include a wireless communication terminal (not illustrated) for wireless communication with another apparatus. The vehicle control system 1 may further include a selector switch (not illustrated) for selecting which is applied, a manual driving mode in which the driver controls the travel of the vehicle 10 or an automated driving mode in which the ECU 8 controls the travel of the vehicle 10.

The GPS receiver 2 receives a GPS signal from a GPS satellite every predetermined period, and determines the location of the vehicle 10, based on the received GPS signal. The GPS receiver 2 then outputs the determination result of the location of the vehicle 10 obtained from the GPS signal to the navigation device 3 and the ECU 8 via the in-vehicle network every predetermined period. The vehicle control system 1 may include a receiver conforming to another satellite positioning system, instead of the GPS receiver 2.

The navigation device 3 executes a navigation program thereon to perform a navigation process on the vehicle 10. For example, when the driver starts the navigation program and inputs a destination of the vehicle 10, the navigation device 3 refers to a map for navigation stored therein to determine a travel route of the vehicle 10 from the current location of the vehicle 10 to the destination in accordance with a predetermined route searching technique, such as Dijkstra's algorithm. The navigation device 3 can use, for example, the location of the vehicle 10 obtained from the latest determination result received from the GPS receiver 2 as the current location of the vehicle 10.

Upon determining a travel route of the vehicle 10, the navigation device 3 outputs information indicating the travel route to the ECU 8 via the in-vehicle network.

The camera 4 includes a two-dimensional detector constructed from an array of optoelectronic transducers, such as CCD or C-MOS, having sensitivity to visible light and a focusing optical system focusing an image of a target region on the two-dimensional detector. The camera 4 is attached in such way that it is oriented in the front direction of the vehicle 10, for example, inside a vehicle interior of the vehicle 10. The camera 4 takes a picture of a region in front of the vehicle 10 every predetermined capturing period (e.g., 1/30 to 1/10 seconds), and generates images in which this region is captured. The images obtained by the camera 4 may be color or gray images. The vehicle 10 may include multiple cameras taking pictures in different orientations or having different focal lengths. For example, the vehicle 10 may include a camera that is oriented in the rear direction of the vehicle 10.

Every time generating an image, the camera 4 outputs the generated image to the ECU 8 via the in-vehicle network.

The driver monitoring camera 5, which is an example of the imaging unit, includes a two-dimensional detector constructed from an array of optoelectronic transducers, such as CCD or C-MOS, having sensitivity to visible or infrared light and a focusing optical system focusing an image of a target region on the two-dimensional detector. The driver monitoring camera 5 may further include a light source, such as an infrared LED, for illuminating the driver. The driver monitoring camera 5 is attached, for example, on or near the instrument panel toward the driver so that the target region of capturing may include the head of the driver sitting on the driver's seat of the vehicle 10, i.e., so that it can capture images of the head of the driver. The driver monitoring camera 5 takes a picture of the driver's head every predetermined capturing period (e.g., 1/30 to 1/10 seconds), and generates images in which the driver's head is captured. These images are referred to as "head images" below for convenience of description in order to distinguish them from images obtained by the camera 4. The head images obtained by the driver monitoring camera 5 may be color or gray images. Every time generating a head image, the driver monitoring camera 5 outputs the generated head image to the ECU 8 via the in-vehicle network.

The touch sensor 6, which is an example of the sensing unit, is attached, for example, on the steering wheel, and outputs a sensing signal indicating that the driver is holding the steering wheel to the ECU 8 via the in-vehicle network when he/she is doing so.

The storage device 7 includes, for example, a hard disk drive or a nonvolatile semiconductor memory. The storage device 7 stores a high-precision map used in the automated driving control of the vehicle. The high-precision map includes, for example, information indicating signposts and road markings, such as lane division lines or stop lines, on the roads included in a predetermined region represented on this map.

The storage device 7 may further include a processor for performing a process to update the high-precision map, a process related to a request from the ECU 8 to read out the high-precision map, and other processes. For example, every time the vehicle 10 moves a predetermined distance, the storage device 7 may transmit a request to acquire a high-precision map together with the current location of the vehicle 10 to a map server through a wireless communication terminal (not illustrated), and receive the high-precision map of a predetermined region around the current location of the vehicle 10 from the map server through the wireless communication terminal. When receiving a request from the ECU 8 to read out the high-precision map, the storage device 7 cuts out that portion of the high-precision map stored therein which includes the current location of the vehicle 10 and represents a region narrower than the predetermined region, and outputs the cut portion to the ECU 8 via the in-vehicle network.

The ECU 8 controls the travel of the vehicle 10. In the present embodiment, when the automated driving mode is applied, the ECU 8 performs the automated driving control of the vehicle 10 under the condition that the driver is continuously looking ahead of the vehicle 10. The ECU 8 also determines whether the driver has become unable to continue looking ahead of the vehicle 10, based on the head images. When determining that the driver has become unable to do so, the ECU 8 executes the DESA function to cause the vehicle 10 to make an emergency stop at a safe place, for example, on a shoulder of a road. After executing the DESA function, the ECU 8 determines whether the driver satisfies a predetermined enabling condition even if the automated driving mode is applied. The ECU 8 then performs the automated driving control of the vehicle 10 only when the enabling condition is satisfied.

As illustrated in FIG. 2, the ECU 8 includes a communication interface 21, a memory 22, and a processor 23. The communication interface 21, the memory 22, and the processor 23 may be separate circuits or a single integrated circuit.

The communication interface 21 includes an interface circuit for connecting the ECU 8 to the in-vehicle network. Every time receiving a determination result of the location of the vehicle from the GPS receiver 2, the communication interface 21 passes the determination result to the processor 23. Every time receiving an image from the camera 4, the communication interface 21 passes the received image to the processor 23. Similarly, every time receiving a head image from the driver monitoring camera 5, the communication interface 21 passes the received head image to the processor 23. When receiving a travel route from the navigation device 3, the communication interface 21 passes the travel route to the processor 23. The communication interface 21 also passes a sensing signal received from the touch sensor 6 to the processor 23. The communication interface 21 also passes the high-precision map loaded from the storage device 7 to the processor 23.

The memory 22, which is an example of a storing unit, includes, for example, volatile and nonvolatile semiconductor memories. The memory 22 stores various algorithms and various types of data used in a vehicle control process performed by the processor 23 of the ECU 8. For example, the memory 22 stores a mode flag indicating the applied driving mode, images of surroundings of the vehicle 10, head images, a determination result of the location of the vehicle, the high-precision map, and internal parameters of the camera 4. The memory 22 also stores various parameters for specifying an object-detecting classifier used for detecting a road feature, another vehicle, or other objects; various parameters used for detecting portions of the driver's face from the head images and for determining the orientation of the face and the sleepiness level of the driver therefrom; and other parameters. The memory 22 also temporarily stores various types of data generated during the vehicle control process. For example, the memory 22 stores a restriction flag indicating whether the automated driving control is restricted due to the execution of the DESA function.

The processor 23 includes one or more central processing units (CPUs) and a peripheral circuit thereof. The processor 23 may further include another arithmetic circuit, such as a logical operation unit, a numerical operation unit, or a graphics processing unit. The processor 23 performs the vehicle control process for the vehicle 10.

Figure 3:
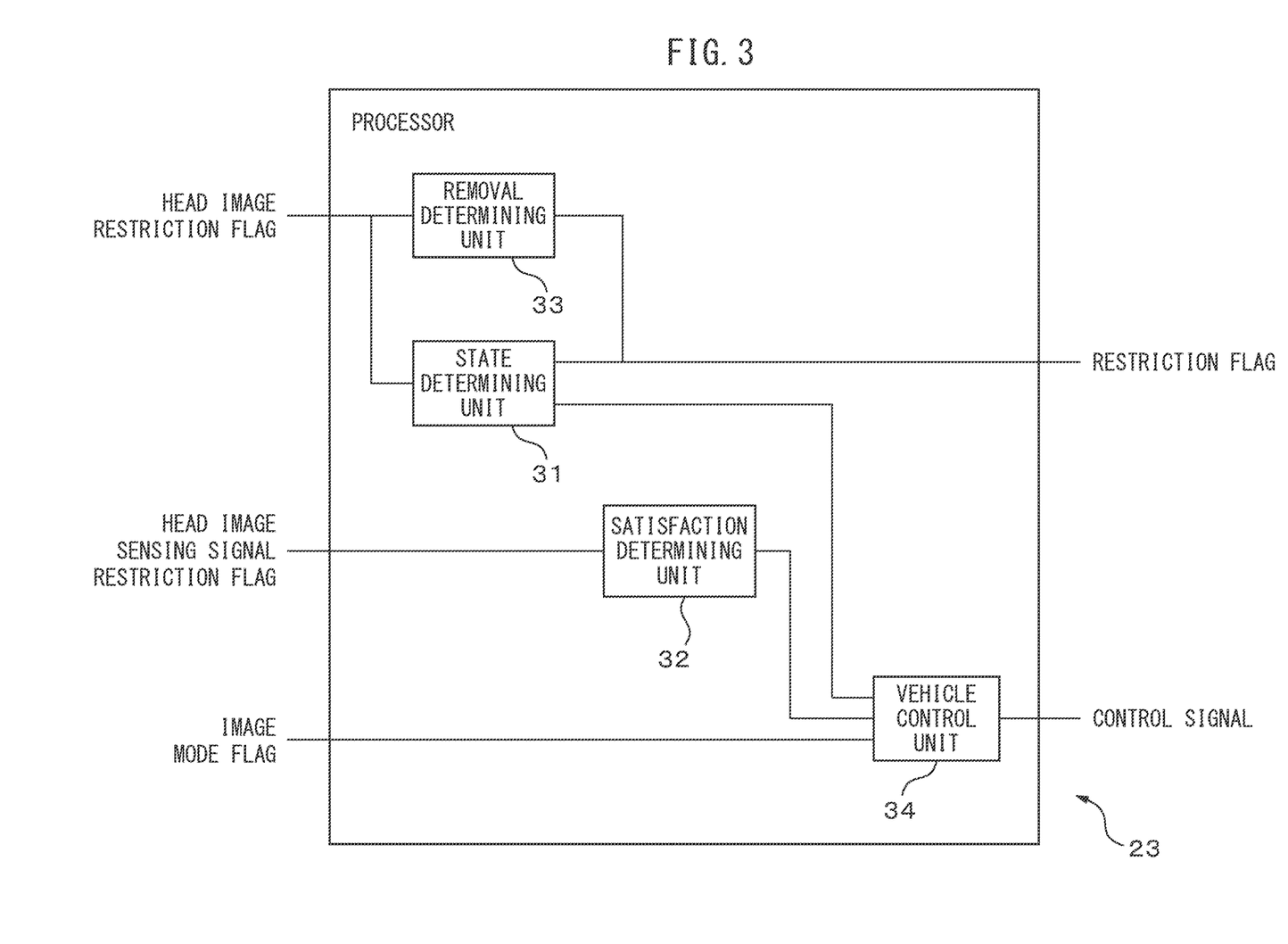
FIG. 3 is a functional block diagram of the electronic control unit, related to a vehicle control process.

FIG. 3 is a functional block diagram of the processor 23, related to the vehicle control process. The processor 23 includes a state determining unit 31, a satisfaction determining unit 32, a removal determining unit 33, and a vehicle control unit 34. These units included in the processor 23 are, for example, functional modules implemented by a computer program executed on the processor 23, or may be dedicated arithmetic circuits provided in the processor 23.

The state determining unit 31 determines whether the driver can currently continue looking ahead of the vehicle 10. When determining that the driver cannot currently do so, the state determining unit 31 causes the DESA function to be executed. For example, every predetermined period, the state determining unit 31 determines the sleepiness level of the driver, based on sequential head images obtained in the latest certain period. When the sleepiness level is such that the driver cannot look ahead of the vehicle 10, the state determining unit 31 determines that the driver cannot currently continue looking ahead of the vehicle 10. To this end, the state determining unit 31 detects the looking direction of the driver and the degrees of opening of his/her eyes and mouth, which are referred to as the "eye-opening level" and "mouth-opening level" below, from each of the sequential head images obtained in the latest certain period, and determines the sleepiness level of the driver, based on the detected looking direction, eye-opening level, and mouth-opening level.

In this case, for example, the state determining unit 31 inputs each head image into a classifier that has been trained to detect a human face from an image, thereby detecting that region of the head image which represents the driver's face. This region is referred to as the "face region" below. As such a classifier, the state determining unit 31 may use, for example, a deep neural network (DNN) having a convolutional neural network (CNN) architecture or an AdaBoost classifier. The state determining unit 31 detects the driver's eyes and mouth from the face region of each head image. To this end, the state determining unit 31 applies, for example, an edge detection filter, such as a Sobel filter, to detect edge pixels in the face region. Then, the state determining unit 31 may detect lines of edge pixels extending in a substantially horizontal direction, and detect, for each of the right and left eyes, such two lines vertically spaced in an area of the face region where the eye is supposed to lie, as the upper and lower eyelids of the eye. Similarly, the state determining unit 31 may detect a sub-area defined by such two lines vertically spaced in an area of the face region where the mouth is supposed to lie, as the driver's mouth. The state determining unit 31 may detect the upper and lower eyelids of the driver's right and left eyes from a head image in accordance with another technique to detect eyelids from an image. Similarly, the state determining unit 31 may detect the driver's mouth from a head image in accordance with another technique to detect a mouth from an image.

For each head image, the state determining unit 31 estimates the eye-opening level of the driver, based on the distances between the upper and lower eyelids of the right and left eyes. For example, the state determining unit 31 may use the average of the distances between the upper and lower eyelids of the right and left eyes as the eye-opening level. The state determining unit 31 may estimate the eye-opening level in accordance with another technique to calculate it from upper and lower eyelids in an image. The state determining unit 31 then calculates the interval between maxima of the eye-opening level from time-varying changes in the eye-opening level for each of the sequential head images as the duration of a single blink of the driver. The state determining unit 31 also counts the number of blinks in the latest certain period, and calculates the average of intervals between the blinks as the period of blinks. The state determining unit 31 also calculates, for example, the ratio of the vertical length of the mouth to the horizontal length thereof for each head image in the latest certain period, and calculates the average of the ratios as the mouth-opening level of the driver. The state determining unit 31 may calculate the mouth-opening level of the driver in accordance with another technique to calculate it from an area of an image representing a mouth.

The state determining unit 31 further detects the looking direction of the driver from each head image. For example, for at least one of the driver's right and left eyes represented in each head image, the state determining unit 31 detects a reflected image of a light source on the cornea (i.e., a Purkinje image), and the centroid of the pupil (hereafter the "pupil centroid") from the area defined by the upper and lower eyelids (hereafter the "eye area"). More specifically, the state determining unit 31 detects a Purkinje image by means of, for example, template matching of the eye area with templates of the Purkinje image. Similarly, the state determining unit 31 may detect the pupil by means of template matching of the eye area with templates of the pupil, and regard the centroid of the area of the detected pupil as the pupil centroid. The state determining unit 31 may detect a Purkinje image and the pupil centroid in accordance with another technique to detect them from an eye area. The state determining unit 31 then calculates the distance between the Purkinje image and the pupil centroid, and refers to a table indicating the relationship between this distance and the looking direction to detect the looking direction of the driver. Such a table may be prestored in the memory 22. The state determining unit 31 then determines the amount of change in the looking direction for each pair of two successive head images in the latest certain period, and divides the average of the amounts of change by the interval of acquisition of the head images to obtain the rate of change of the looking direction.

The state determining unit 31 determines the sleepiness level of the driver, based on at least one of the period and frequency of blinks, the mouth-opening level, and the rate of change of the looking direction. When the sleepiness level is such that the driver cannot look ahead of the vehicle 10, the state determining unit 31 determines that the driver cannot currently continue looking ahead of the vehicle 10. For example, the state determining unit 31 determines that the sleepiness level of the driver is such a level in the case that the number of blinks in the latest certain period is greater than a predetermined number of times; the period of blinks is longer than a predetermined time threshold; and the mouth-opening level is greater than a predetermined opening level.

The state determining unit 31 may determine whether the driver can currently continue looking ahead of the vehicle 10, based on another index indicating the state of the driver. For example, when the driver's face or eyes are not detected from the head images for a predetermined period, the state determining unit 31 may determine that the driver cannot currently continue looking ahead of the vehicle 10. Alternatively, when the driver closes his/her eyes for a predetermined period, the state determining unit 31 may determine that the driver cannot currently continue looking ahead of the vehicle 10. In this case, when the eye-opening level is lower than an eye-closing determining threshold corresponding to the eyes being closed, the state determining unit 31 may determine that the driver closes his/her eyes.

When determining that the driver cannot currently continue looking ahead of the vehicle 10, the state determining unit 31 instructs the vehicle control unit 34 to execute the DESA function. The state determining unit 31 then rewrites the restriction flag so that it may indicate the automated driving control being restricted. In contrast, when determining that the driver can currently continue looking ahead of the vehicle 10, the state determining unit 31 need not cause the DESA function to be executed.

The satisfaction determining unit 32 determines whether the behavior of the driver satisfies a predetermined enabling condition related to driving control of the vehicle 10 when the enabling condition is imposed due to the execution of the DESA function, i.e., when the restriction flag indicates that the automated driving control is restricted.

The predetermined enabling condition is such that satisfaction thereof is not required before the execution of the DESA function for the purpose of enabling application of the automated driving control, as described above. For example, assume that the condition related to the behavior of the driver and required for the ECU 8 to perform the automated driving control before the execution of the DESA function is to continue looking ahead of the vehicle 10, and that the driver is not required to hold the steering wheel before the execution of the DESA function. In this case, the enabling condition may be that the driver holds the steering wheel. Setting such an enabling condition allows for drawing the driver's attention to the driving control of the vehicle 10 even during the automated driving control, preventing the driver from putting too much trust in the DESA function more appropriately. The enabling condition is not limited to this example and may be, for example, to place a foot on the brake or accelerator pedal.

In the case that the enabling condition is that the driver holds the steering wheel, the satisfaction determining unit 32 determines whether a sensing signal indicating that the driver is holding the steering wheel is received from the touch sensor 6 while the enabling condition is imposed. When a sensing signal indicating that the driver is doing so is received, the satisfaction determining unit 32 determines that the behavior of the driver satisfies the enabling condition. When the behavior of the driver satisfies the enabling condition and when the driver is continuously looking ahead of the vehicle 10, the satisfaction determining unit 32 notifies the vehicle control unit 34 that the automated driving control is applicable.

In contrast, when a sensing signal indicating that the driver is holding the steering wheel is not received, the satisfaction determining unit 32 determines that the behavior of the driver does not satisfy the enabling condition. In this case, the satisfaction determining unit 32 may notify the driver of a warning, which requires him/her to hold the steering wheel, with a display (not illustrated) or a speaker (not illustrated) provided inside the vehicle, or a vibrator (not illustrated) provided in the steering wheel or the driver's seat. When the behavior of the driver does not satisfy the enabling condition or when the driver is not continuously looking ahead of the vehicle 10, the satisfaction determining unit 32 notifies the vehicle control unit 34 that the automated driving control is not applied.

For example, the satisfaction determining unit 32 detects the orientation of the driver's face or the looking direction of the driver from sequential head images obtained in the latest certain period. When the driver's face or eyes are oriented to the front direction of the vehicle 10, the satisfaction determining unit 32 determines that the driver is looking ahead of the vehicle 10.

For example, in the case that it determines whether the driver is looking ahead of the vehicle 10, based on the orientation of the driver's face, the satisfaction determining unit 32 performs a process similar to that of the state determining unit 31 on each head image to detect the face region from each head image. The satisfaction determining unit 32 then detects multiple characteristic points of the driver's face, such as the inner and outer canthi, the tip of the nose, and the corners of the mouth, from the face region of each head image. To this end, for example, the satisfaction determining unit 32 inputs the face region into a classifier that has been trained to detect characteristic points of a face represented in an image, thereby detecting the characteristic points. As such a classifier, the satisfaction determining unit 32 may use, for example, a DNN having a CNN architecture, a support vector machine, or an AdaBoost classifier. Alternatively, the satisfaction determining unit 32 may detect the characteristic points of the driver's face from the face region by means of template matching of the face region with templates representing the characteristic points of a face or in accordance with another technique to detect such characteristic points. The satisfaction determining unit 32 fits the detected characteristic points of the face into a three-dimensional facial model representing the three-dimensional shape of a face. The satisfaction determining unit 32 then detects, as the orientation of the driver's face, the orientation of the face of the three-dimensional facial model that the characteristic points best fit. The satisfaction determining unit 32 may detect the orientation of the driver's face, based on the head images, in accordance with another technique to determine the orientation of a face represented in an image. The satisfaction determining unit 32 determines whether the detected orientation of the driver's face is within a predetermined angle range corresponding to the direction to the front of the vehicle 10. When the detected orientation is within the predetermined angle range, the satisfaction determining unit 32 determines that the driver's face is directed to the front of the vehicle 10. When the detected orientation is outside the predetermined angle range, the satisfaction determining unit 32 determines that the driver's face is not directed to the front of the vehicle 10.

Alternatively, in the case that it determines whether the driver is looking ahead of the vehicle 10, based on the looking direction of the driver, the satisfaction determining unit 32 may perform a process for detecting the looking direction, which is similar to that of the state determining unit 31, on each head image to detect the looking direction of the driver from each head image. Alternatively, the satisfaction determining unit 32 may receive the detection result of the looking direction for each head image from the state determining unit 31. The satisfaction determining unit 32 then determines whether the detected looking direction of the driver is within a predetermined angle range corresponding to the direction to the front of the vehicle 10. When the detected looking direction is within the predetermined angle range, the satisfaction determining unit 32 determines that the driver's eyes are directed to the front of the vehicle 10. When the detected looking direction is outside the predetermined angle range, the satisfaction determining unit 32 determines that the driver's eyes are not directed to the front of the vehicle 10.

When determining that the driver's face or eyes are not directed to the front of the vehicle 10 for a head image, the satisfaction determining unit 32 determines that the driver is not continuously looking ahead of the vehicle 10. The driver may turn his/her face or eyes to an area other than the front of the vehicle 10 in order to check not only the situation of the front of the vehicle 10 but also that of the side or rear thereof. Thus, only when determination that the driver's face or eyes are not directed to the front of the vehicle 10 has continued longer than a predetermined period, the satisfaction determining unit 32 may determine that the driver is not continuously looking ahead of the vehicle 10.

According to a modified example, the satisfaction determining unit 32 may additionally determine whether the sleepiness level of the driver is such that he/she can continue looking ahead of the vehicle 10. Then, when the driver's face or eyes are directed to the front of the vehicle 10 and when the sleepiness level is such that the driver can continue looking ahead of the vehicle 10, the satisfaction determining unit 32 may determine that the driver is continuously looking ahead of the vehicle 10. In this case, the satisfaction determining unit 32 may determine that the sleepiness level of the driver is such a level, for example, in the case that the rate of change of the looking direction is greater than a predetermined rate threshold and that the mouth-opening level is lower than a predetermined value.

When the predetermined enabling condition is not imposed, the satisfaction determining unit 32 determines whether the driver is continuously looking ahead of the vehicle 10 from sequential head images. When determining that the driver is doing so, the satisfaction determining unit 32 notifies the vehicle control unit 34 that the automated driving control is applicable. In contrast, when determining that the driver is not continuously looking ahead of the vehicle 10, the satisfaction determining unit 32 notifies the vehicle control unit 34 that the automated driving control is not applied. Additionally, when the applied driving mode is the automated driving mode, the satisfaction determining unit 32 may notify the driver of a warning, which requires him/her to look ahead of the vehicle 10 and indicates that the automated driving control is no longer performed, with the display (not illustrated) or the speaker (not illustrated) provided inside the vehicle, or the vibrator (not illustrated) provided in the steering wheel or the driver's seat.

When determining that the automated driving control having been applied to the vehicle 10 is no longer applied, the satisfaction determining unit 32 may notify the driver of switching from the automated driving control to manual driving control with the display (not illustrated) or the speaker (not illustrated) provided inside the vehicle, or the vibrator (not illustrated) provided in the steering wheel or the driver's seat. Then, in the case that it does not redetermine the automated driving control being applicable in a certain period from the notification, the satisfaction determining unit 32 may notify the vehicle control unit 34 that the automated driving control is no longer applied, and switch the driving mode of the vehicle 10 from the automated driving mode to the manual driving mode.

The removal determining unit 33 determines whether to remove the predetermined enabling condition that is imposed to perform the automated driving control after the execution of the DESA function. For example, when a predetermined period (e.g., 1 to 2 hours) has elapsed since the stop of the vehicle 10 caused by the execution of the DESA function, the removal determining unit 33 determines to remove the enabling condition. Alternatively, when the vehicle 10 has traveled longer than a predetermined distance (e.g., 100 to 200 km) since the stop of the vehicle 10 caused by the execution of the DESA function, the removal determining unit 33 may determine to remove the enabling condition.

Alternatively, when a state in which the driver can look ahead of the vehicle 10 has continued for a certain period (e.g., 30 minutes to 1 hour) or a certain travel distance (e.g., 50 to 100 km) after the stop of the vehicle 10 caused by the execution of the DESA function, the removal determining unit 33 may determine to remove the enabling condition. For example, when a state in which the sleepiness level of the driver is such that he/she can continue looking ahead of the vehicle 10 has continued for a certain period or a certain travel distance, the removal determining unit 33 may determine to remove the enabling condition. Setting such a removal condition allows for preventing the driver from neglecting to look ahead of the vehicle 10 even during the automated driving control. The removal determining unit 33 may perform a process for determining the sleepiness level, which is similar to that described in relation to the state determining unit 31 and the satisfaction determining unit 32, for each head image to determine the sleepiness level of the driver. To this end, the removal determining unit 33 may receive, from the state determining unit 31 or the satisfaction determining unit 32, characteristic quantities (e.g., the period and frequency of blinks, and the rate of change of the looking direction) that are used for determining the sleepiness level and indicate sleepiness of the driver. Alternatively, the removal determining unit 33 may receive a determination result of the sleepiness level from the state determining unit 31 or the satisfaction determining unit 32.

Alternatively, when the driver is looking an object near the vehicle 10, the removal determining unit 33 may determine that the driver is in a state in which he/she can look ahead of the vehicle 10. In this case, the removal determining unit 33 detects the object near the vehicle 10 from an image obtained by the camera 4, and determines the direction to the detected object with respect to the camera 4, based on the position of the centroid of the area of the image representing the detected object. Then, when the difference between the direction to the detected object and the orientation of the driver's face or his/her looking direction at acquisition of the image is smaller than a predetermined angle difference, the removal determining unit 33 may determine that the driver is looking the detected object. In this case, the removal determining unit 33 may perform a process for detecting the orientation of a face, which is similar to that described in relation to the satisfaction determining unit 32, for each head image to detect the orientation of the driver's face. Alternatively, the removal determining unit 33 may receive the detection result of the orientation of the driver's face for each head image from the satisfaction determining unit 32. Similarly, the removal determining unit 33 may perform a process for detecting the looking direction, which is similar to that described in relation to the state determining unit 31, for each head image to detect the looking direction of the driver. Alternatively, the removal determining unit 33 may receive the detection result of the looking direction of the driver for each head image from the state determining unit 31 or the satisfaction determining unit 32.

For example, the removal determining unit 33 inputs an image into a classifier to detect an object near the vehicle 10. This classifier has been trained to detect a detection target, such as a vehicle, from an image. As a classifier to detect a target object, a deep neural network (DNN) having a convolutional neural network (CNN) architecture, such as a Single Shot MultiBox Detector (SSD) or a Faster R-CNN, is used, for example. In the case that the vehicle 10 includes a distance sensor, such as a LiDAR sensor, the removal determining unit 33 may detect an object near the vehicle 10, based on a ranging signal obtained from the distance sensor.

When determining to remove the predetermined enabling condition, the removal determining unit 33 rewrites the restriction flag so that it may indicate the automated driving control being not restricted.

Figure 4:
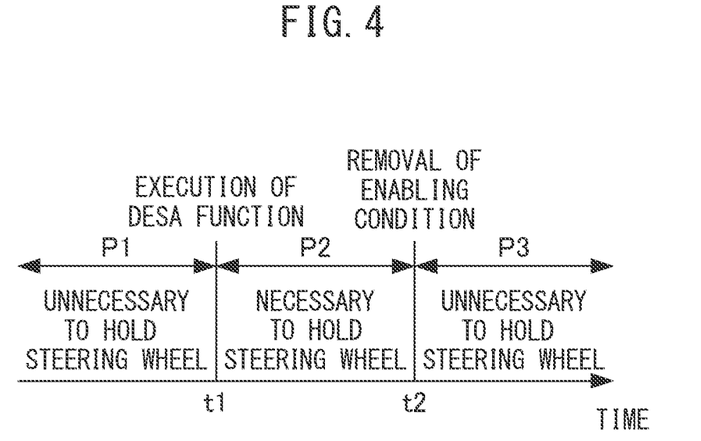
FIG. 4 is a diagram for explaining imposition and removal of a predetermined enabling condition in the vehicle control process of the present embodiment.

FIG. 4 is a diagram for explaining imposition and removal of the predetermined enabling condition in the vehicle control process of the present embodiment. The abscissa of FIG. 4 represents time. In this example, assume that the DESA function is executed at time t1. In this case, the automated driving control is enabled in period P1 before time t1 without imposition of the enabling condition. More specifically, the ECU 8 of the present embodiment performs the automated driving control of the vehicle 10 as long as the driver continues looking ahead of the vehicle 10 even if the driver keeps his/her hands off the steering wheel. In period P2 from time t1 to time t2 at which the enabling condition is removed, the automated driving control is enabled only when the enabling condition is satisfied (in the present embodiment, when the driver is not only continuously looking ahead of the vehicle 10, but also holding the steering wheel). However, in period P2 also, the automated driving control may be enabled, for example, until determination whether the enabling condition is satisfied even if the enabling condition is not satisfied. In period P3 from time t2, the automated driving control is enabled without imposition of the enabling condition, as in period P1.

The vehicle control unit 34 performs the automated driving control of the vehicle 10 when the automated driving mode is applied and when it is notified from the satisfaction determining unit 32 that the automated driving control is applicable. In the present embodiment, the vehicle control unit 34 performs the automated driving control of the vehicle 10 when the mode flag indicates that the automated driving mode is applied and when the driver is continuously looking ahead of the vehicle 10. In the case that the predetermined enabling condition is imposed after the execution of the DESA function, i.e., in the case that the restriction flag indicates the automated driving control being restricted, the vehicle control unit 34 performs the automated driving control of the vehicle 10 only when the enabling condition is satisfied.

For example, the vehicle control unit 34 generates one or more planned travel paths (trajectories) of the vehicle 10 in the nearest predetermined section (e.g., 500 m to 1 km) so that the vehicle 10 will travel along the travel route to a destination. When executing the DESA function, the vehicle control unit 34 may generate a planned travel path so that the vehicle 10 will stop on a shoulder of a road. Each planned travel path is represented, for example, as a set of target locations of the vehicle 10 at respective time points during the travel of the vehicle 10 through the predetermined section. The vehicle control unit 34 then controls the components of the vehicle 10 so that the vehicle 10 will travel along the planned travel path.

To generate such a travel path, the vehicle control unit 34 detects an object near the vehicle 10 from each of the sequential images obtained by the camera 4. For example, the vehicle control unit 34 may input the image into a classifier to detect an object near the vehicle 10 in a manner similar to that described in relation to the removal determining unit 33. Alternatively, in the case that the vehicle 10 includes a distance sensor, such as a LiDAR sensor, the vehicle control unit 34 may detect an object near the vehicle 10, based on a ranging signal obtained from the distance sensor. Alternatively, the vehicle control unit 34 may receive a result of object detection for each image from the removal determining unit 33.

The vehicle control unit 34 generates the planned travel path so that the vehicle 10 will not collide with objects near the vehicle 10. To this end, the vehicle control unit 34 tracks objects that are detected, for example, from the sequential images and located near the vehicle 10, and uses the trajectories obtained from the tracking result to determine predicted trajectories of the respective objects to a predetermined time ahead. To this end, the vehicle control unit 34 can track the detected objects by using, for example, a Kalman Filter or a Particle Filter to perform a tracking process on the objects at the times of capturing the respective images.

The vehicle control unit 34 generates the planned travel path of the vehicle 10, based on the predicted trajectories of the objects that are being tracked, so that a predicted distance between the vehicle 10 and any of the objects will be greater than a predetermined distance until a predetermined time ahead.

The vehicle control unit 34 may generate multiple planned travel paths. In this case, the vehicle control unit 34 may select one of the planned travel paths such that the sum of the absolute values of acceleration of the vehicle 10 is the smallest.

Upon determining a planned travel path, the vehicle control unit 34 controls the components of the vehicle 10 so that the vehicle 10 will travel along the planned travel path. For example, the vehicle control unit 34 determines the acceleration of the vehicle 10 in accordance with the planned travel path and the current speed of the vehicle 10 measured by a vehicle speed sensor (not illustrated), and determines the degree of accelerator opening or the amount of braking so that the acceleration of the vehicle 10 will be equal to the determined acceleration. The vehicle control unit 34 then determines the amount of fuel injection in accordance with the determined degree of accelerator opening, and outputs a control signal depending on the amount of fuel injection to a fuel injector of the engine of the vehicle 10. Alternatively, the vehicle control unit 34 outputs a control signal depending on the determined amount of braking to the brake of the vehicle 10.

When the vehicle 10 changes its course in order to travel along the planned travel path, the vehicle control unit 34 determines the steering angle of the vehicle 10 in accordance with the planned travel path, and outputs a control signal depending on the steering angle to an actuator (not illustrated) controlling the steering wheel of the vehicle 10.

Figure 5:
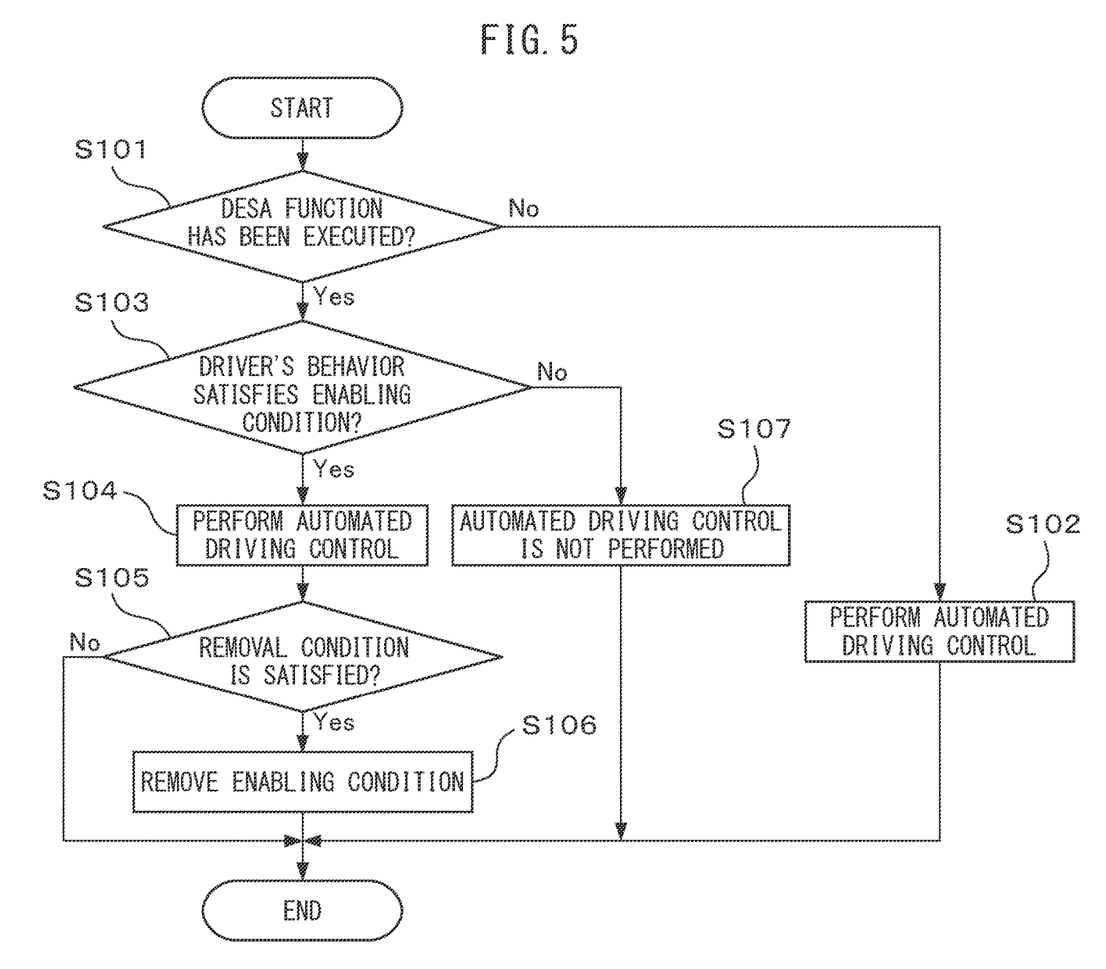
FIG. 5 is an operation flowchart of the vehicle control process.

FIG. 5 is an operation flowchart of the vehicle control process performed by the processor 23. While the vehicle 10 is in the automated driving mode, the processor 23 may perform the vehicle control process in accordance with the following operation flowchart every predetermined period, e.g., every time a head image is obtained.

The satisfaction determining unit 32 of the processor 23 determines whether the DESA function has been executed (step S101). In the case that the DESA function has not been executed (No in Step S101) and that the driver is looking ahead of the vehicle 10, the satisfaction determining unit 32 instructs the vehicle control unit 34 of the processor 23 to perform the automated driving control of the vehicle 10. The vehicle control unit 34 then performs the automated driving control of the vehicle 10 (step S102).

In the case that the DESA function has been executed (Yes in Step S101), the satisfaction determining unit 32 determines whether the behavior of the driver satisfies a predetermined enabling condition (step S103). When the behavior of the driver satisfies the enabling condition (Yes in Step S103), the satisfaction determining unit 32 instructs the vehicle control unit 34 of the processor 23 to perform the automated driving control of the vehicle 10. The vehicle control unit 34 then performs the automated driving control of the vehicle 10 (step S104). The removal determining unit 33 of the processor 23 then determines whether a predetermined removal condition is satisfied (step S105). When the removal condition is satisfied (Yes in Step S105), the removal determining unit 33 removes the enabling condition, restoring the control state of the vehicle 10 to the state before the execution of the DESA function (step S106).

In contrast, when the behavior of the driver does not satisfy the enabling condition (No in Step S103), the vehicle control unit 34 does not apply the automated driving control to the vehicle 10 (step S107). In other words, the ECU 8 causes the driver to control driving of the vehicle 10. However, even in this case, the vehicle control unit 34 may control the vehicle 10 in accordance with the DESA function during the execution thereof.

After step S102, S106, or S107, or when the behavior of the driver does not satisfy the removal condition (No in Step S105), the processor 23 terminates the vehicle control process.

Separately from the process of the above operation flowchart, the state determining unit 31 of the processor 23 may determine, every predetermined period, whether to cause the DESA function to be executed. When the state determining unit 31 has determined to do so, the vehicle control unit 34 may cause the vehicle 10 to make an emergency stop prior to the process of the above operation flowchart, and rewrite the restriction flag so that it may indicate the predetermined enabling condition being imposed.

As has been described above, after the execution of the DESA function, the vehicle controller performs the automated driving control of the vehicle only when the behavior of the driver satisfies the predetermined enabling condition that is not imposed before the execution of the DESA function. For this reason, the vehicle controller can prevent the driver from putting too much trust in the DESA function and neglecting to look around the vehicle, and also prevent excessive restriction of the automated driving control and loss of driver's convenience. Additionally, since satisfaction of the predetermined removal condition after the execution of the DESA function results in removal of the enabling condition, the vehicle controller can prevent loss of driver's convenience caused by permanent imposition of the enabling condition.

According to a modified example, the ECU 8 may perform the automated driving control of the vehicle 10 in the automated driving mode until executing the DESA function even if the driver is not looking ahead of the vehicle 10. In this case, the enabling condition may be that the driver continues looking ahead of the vehicle 10. In this case, while the enabling condition is imposed due to the execution of the DESA function, the satisfaction determining unit 32 may perform a process similar to that of the above embodiment to determine whether the driver is continuously looking ahead of the vehicle 10. When the driver is doing so, the satisfaction determining unit 32 may notify the vehicle control unit 34 that the automated driving control is applicable. In contrast, when the driver is not continuously looking ahead of the vehicle 10, the satisfaction determining unit 32 may notify the driver of a warning, which requires him/her to look ahead of the vehicle 10 and indicates that the automated driving control is no longer performed, with the display (not illustrated) or the speaker (not illustrated) provided inside the vehicle, or the vibrator (not illustrated) provided in the steering wheel or the driver's seat.

As described above, those skilled in the art may make various modifications according to embodiments within the scope of the present invention.

What is claimed is:

1. A vehicle controller capable of automated driving control of a vehicle, comprising:
   a processor programmed to:
      determine whether a behavior of a driver of the vehicle satisfies a predetermined enabling condition after execution of a function of automatically stopping the vehicle, the function being executed due to not satisfying a driver-related condition for continuing the automated driving control of the vehicle, the enabling condition relating to driving control of the vehicle and being not imposed before the execution of the function; and perform the automated driving control of the vehicle only when the behavior of the driver satisfies the enabling condition, after the execution of the function, wherein the processor is further programmed to
determine whether a predetermined removal condition is satisfied after the execution of the function, remove the enabling condition when the predetermined removal condition is satisfied, and enable the automated driving control of the vehicle even when the enabling condition is not satisfied after the enable condition is removed.

2. The vehicle controller according to claim 1, wherein the removal condition is that a state in which the driver is able to look ahead of the vehicle continues for a certain period or a certain travel distance, and the processor determines whether the state continues for the certain period or the certain travel distance, based on sequential images obtained by a camera provided in the vehicle so as to capture images of the head of the driver.

3. The vehicle controller according to claim 1, wherein the enabling condition is that the driver holds a steering wheel of the vehicle, and, when receiving, from a sensor provided on the steering wheel, a sensing signal indicating that the driver is holding the steering wheel, the processor determines that the behavior of the driver satisfies the enabling condition.

4. The vehicle controller according to claim 1, wherein the enabling condition is applied while the vehicle is traveling.

* * * * *